Patented Apr. 28, 1931

1,802,866

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

METHOD OF TREATING COLLOIDAL SUBSTANCES AND THE PRODUCTS THEREOF

No Drawing.    Application filed November 9, 1926.    Serial No. 147,386.

Among the objects of my invention is to make a composition of matter containing glue and rubber latex and to treat this composition with an insolubilizing medium to make the glue water-resistant after the water has been removed therefrom.

Another object of my invention is to make a more or less adhesive composition, having water-resistant qualities, which may be used to glue wood, paper or laminated articles.

A still further object of my invention is to make a water-resistant adhesive-like composition which will act as a binder for filling materials and which is also moldable.

The composition is useful in many of the arts and may be vulcanized, cured, or otherwise treated as desired.

The glue used in my composition is restricted to the varieties known as animal or fish glues and is to be so understood throughout this specification and the claims and may be used in either crude, refined, ground or liquid state.

The term "latex" is meant to include the natural rubbery saps as well as artificial aqueous dispersions of the rubber gums or artificial aqueous dispersions of synthetic rubbers.

Animal or fish glues are advantageous because, among other properties, they may be dissolved in a small amount of water under heat and also because they may be added directly to the latex in a substantially dry condition without coagulating the latex and are also dissolved therein. It is preferable, however, to first dissolve the glue in about twice its weight of water, then to allow the solution to take place with the aid of heat and then to add the solution to the latex.

To the composition thus formed may then be added, if desired, oils, oily substances, or inaqueous materials such as tars, pitches, asphalts, resins, waxes or gum rubber dissolved in oils or other organic solvents without the necessity of first emulsifying them.

To the latex-glue composition with or without the other materials as heretofore mentioned, is then added an insolubilizing agent or medium to act upon the glue in the composition. The agent may act on the glue alone or agents, such as sulphuric acid, acid salts or acid gases, capable of both insolubilizing the glue and also precipitating or coagulating the latex, may be used. The coagulation of the entire mass is sometimes desirable when plastic or moldable articles are to be made, the coagulation step helping to remove the water. Among the agents adapted to insolubilize only may be mentioned formaldehyde, water soluble chromates, the more or less neutral tannins, hexamethylene-tetramine. The insolubilizing action of some of these agents is not immediate for as in the case of the chromates, the sun's rays are sometimes necessary to complete the insolubilizing action of the chromates or, as is the case with hexamethylene tetramine, heat and the presence of moisture and ammonia.

In some of the arts the presence of water in my composition is undesirable and may be removed by evaporation or dehydration or otherwise. When the water content of the composition is to be removed by means other than evaporation or dehydration, the rubber and the whole solid content with its entrained or occluded oily, gummy or resinous substances may be coagulated or separated from the liquid by a coagulant. The insolubilizing agent for the glue is preferably added to the composition prior to adding the coagulant but it may be added at the same time or, as mentioned before, the insolubilizing agent and the coagulating agent may be the same.

Softeners, such as glycerine, or filling materials, such as zinc oxide, blanc fixe or bronzes may be also added to the glue or to the composition when desirable. Filling materials commonly used in the rubber and adhesive arts sometimes have an undesirable coagulative effect or have a tendency to lump when added to aqueous dispersions of rubber and when this is to be avoided it is preferable to either grind or mix these fillers in an oil or oily or waxy substance first. As oils and waxes are commonly added to rubber mixes the choice of such materials depends upon the character of the finished product. If the oils, greases or waxes are of a solid or extremely viscous nature, they may be heated or dissolved in a light viscosity solvent and then mixed with the filling material. Preserving agents, such as beta or alpha naphthol, borax, essential oils, creosotes, sodium salicylate or naphthalene, may be added to the composition or added to the glue alone to protect it from the action of decay or bacteria.

In the manufacture or subsequent treatment or refining processes of animal or fish glues an excess of acid is often present in sufficient quantity to coagulate the latex prematurely and to prevent this it may be necessary at times to neutralize the excess acid or, when using dry glue, to add the powered glue to the latex in the presence of a surrounding film of oil. This film may be formed by mixing the powdered glue with a small amount of an oil such as castor or mineral oil. If oils in larger quantities are to be used in the composition, the glue may be added to said oils before their addition to the mixture.

As examples of useful compositions made by my invention, I give the following:

| | Parts by weight |
|---|---|
| Glue | 15 |
| Water | 25 |
| This glue solution is then mixed with— | |
| Rubber latex | 175 |
| To the composition thus formed is added— | |
| China wood oil | 20 |
| Zinc oxide ground in oil | 35 |
| Ochre or other pigment or filling material | 20 |
| Sulphur | 5 |
| Potassium bichromate approximately 20% solution | 6 |

When the insolubilizing agent, potassium bichromate, is added, the composition is preferably thoroughly agitated to obtain the maximum insolubilizing action and also to prevent local coagulation.

The viscosity of the composition may be varied by altering the proportions of water and filling material.

| | Parts by weight |
|---|---|
| Glue | 10 |
| Water | 15 |
| This glue solution is then mixed with rubber latex | 5 |
| To this composition is then added an insolubilizing agent, formaldehyde, approximately 20% solution | 3 |
| Following which is added alpha naphthol which acts as a preservative. | ½ |
| This composition may be precipitated or coagulated if desired by adding alum, approximately 20% solution | 5 |

While I have herein described some particular compositions embodying my invention and methods of producing the same it is to be understood that the invention is not limited to the precise methods, ingredients or properties mentioned.

Having thus described my invention, I claim and desire to protect by Letters Patent of the United States:

1. The method of making an aqueously dispersed composition of matter having adhesive properties comprising the mixing of rubber latex with glue and then adding an insolubilizing agent thereto to make the glue water-resistant after the removal of the water therefrom.

2. The method of making an aqueously dispersed composition of matter having adhesive properties comprising the intimate mixing of glue with rubber latex, adding an insolublizing agent for said glue, adding a preservative agent and then removing the water therefrom.

3. An aqueously dispersed composition of matter having adhesive properties comprising glue, rubber latex and an insolubilizing agent for said glue.

In witness whereof I have hereunto set my hand this 8th day of November, 1926.

ARTHUR BIDDLE.